(12) United States Patent
Hsieh et al.

(10) Patent No.: US 7,389,313 B1
(45) Date of Patent: Jun. 17, 2008

(54) SYSTEM AND METHOD FOR CREATING A SNAPSHOT COPY OF A DATABASE

(75) Inventors: Tsaiying "George" Hsieh, Cupertino, CA (US); Lan "Laura" Lo, San Jose, CA (US); Xinyi David Lai, Danville, CA (US); Raghupathi "Raghu" Malige, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 444 days.

(21) Appl. No.: 10/288,712

(22) Filed: Nov. 5, 2002

Related U.S. Application Data (60) Provisional application No. 60/401,720, filed on Aug. 7, 2002.

(51) Int. Cl.
G06F 12/16 (2006.01)
(52) U.S. Cl. ...................................... 707/204
(58) Field of Classification Search ............... 707/202, 707/204; 711/162; 714/15, 6; 713/200
See application file for complete search history.

(56) References Cited

U.S. PATENT DOCUMENTS

| | | | |
|---|---|---|---|
| 5,515,502 A * | 5/1996 | Wood .......................... | 714/15 |
| 5,594,900 A | 1/1997 | Cohn et al. | |
| 5,644,696 A * | 7/1997 | Pearson et al. ................ | 714/6 |
| 5,835,953 A * | 11/1998 | Ohran ......................... | 711/162 |
| 5,852,715 A * | 12/1998 | Raz et al. ................... | 709/201 |
| 5,920,873 A * | 7/1999 | Van Huben et al. ........ | 707/202 |
| 5,956,713 A | 9/1999 | Bamford et al. | |
| 6,014,676 A * | 1/2000 | McClain .................... | 707/204 |
| 6,081,875 A | 6/2000 | Clifton et al. | |
| 6,105,030 A | 8/2000 | Syed et al. | |
| 6,199,074 B1 | 3/2001 | Kern et al. | |
| 6,324,548 B1 | 11/2001 | Sorenson | |
| 6,385,706 B1 * | 5/2002 | Ofek et al. ................. | 711/162 |
| 2001/0047482 A1 * | 11/2001 | Harris et al. ................ | 713/200 |
| 2003/0093444 A1 * | 5/2003 | Huxoll ....................... | 707/204 |

OTHER PUBLICATIONS

Doug Stacey, "Replication: DB2, Oracle, or Sybase?" vol. 24, Issue 4 (Dec. 1995) □□pp. 95-101, ISSN:0163-5808.*
Matt Bishop, "How to Write a Setuid Program", retrieved online from nob.cs.ucdavis.edu/bishop/secprog/1987-sproglogin.pdf, 1987, 19 pages.*
Bruce Epstein, "Zeus Tech Note Windows INI and Registry files", retreived online from http://www.zeusprod.com/technote/winini.html, 1997, 3 pages.*

(Continued)

*Primary Examiner*—Paul Rodriguez
*Assistant Examiner*—Luke Osborne
(74) *Attorney, Agent, or Firm*—Meyertons Hood Kivlin Kowert & Goetzel, P.C.; B. Noël Kivlin (57) ABSTRACT

A method for creating a snapshot copy of a database object includes creating a mirror of the database on a plurality of volumes. A user may provide a request to create a snapshot of a database object to a database utility. The database utility responds to the snapshot request by providing an indication of selected volumes of the mirror that correspond to the database object to a volume manager. The volume manager then creates a snapshot volume for each of the selected volumes of the mirror.

25 Claims, 10 Drawing Sheets

OTHER PUBLICATIONS

Subbarao Kambhampati, "A validation-structure-based theory of plan modification and reuse", 1992, Elsevier, Artificial Intelligence 55, pp. 193-258.*

"VERITAS FlashSnap, Guidelines for Using VERITAS FlashSnap"; VERITAS Software Corporation; 2002, 15 pages.

"Storage Virtualization"; VERITAS Software Corporation; 2001, 22 pages.

"VERITAS Volume Management Products for Windows, The Next Generation of Disk Management for Windows Platforms"; VERITAS Software Corporation; Mar. 2002, 13 pages.

* cited by examiner

```
PRIMARY_HOST=primary_server
SECONDARY_HOST=target_server
PRIMARY_DG=source_dg
SNAPSHOT_DG=target_dg
ORACLE_SID=$ORACLE_SID
ORACLE_HOME=$ORACLE_HOME
ORACLE_PFILE=pfile_path
ARCHIVELOG_DEST=archivelog_dest_path
SNAPSHOT_ARCHIVELOG=yes/no
SNAPSHOT_MODE=online/offline
SNAPSHOT_PLAN_FOR=tablespaces/tables/database
TABLESPACES="tbs1 tbs2 ... "
TABLES="tb1 tb2 ... "
#default to no
SNAPSHOT_ORACLE_HOME=yes/no
SNAPSHOT_VOL_PREFIX=SNAP_
```

SYSTEM AND METHOD FOR CREATING A SNAPSHOT COPY OF A DATABASE

PRIORITY INFORMATION

This application claims priority to U.S. provisional application Ser. No. 60/401,720, filed Aug. 7, 2002.

BACKGROUND

1. Field of the Invention

This invention relates to database storage systems and, more particularly, to techniques for creating snapshot copies of a database.

2. Description of the Related Art

Many business organizations and governmental entities rely upon large databases, sometimes exceeding a terabyte or many terabytes of data, for mission-critical applications. It is common that many such database applications require near-continuous access. For example, many systems such as retail processing databases, airline reservation databases, and financial institution databases must be available to perform transaction processing 24 hours a day. Downtime associated with such systems can be disastrous.

With the growing amounts of data and shrinking acceptable downtime requirements of modern database systems, organizations are sometimes squeezed by the conflicting demands associated with a database environment. For example, secondary operations such as data backup operations, reporting and analysis, and application testing can be of significant importance. However, such secondary operations can interrupt or encumber the normal transaction processing of a host system running a database application.

To minimize these problems, some systems support snapshot capabilities that allow point-in-time copies of data to be created. By creating snapshots of the appropriate storage devices, a frozen image of the database can be created and can then be used to facilitate the secondary operations. For example, the snapshot copies containing the image can be installed on a secondary host that performs the secondary operations. In this manner, availability of the primary host for normal transaction processing can be maximized.

The creation of snapshot copies can be based on data-mirroring technology implemented by a volume manager running on the host system. In a data mirroring configuration, identical copies of data are stored on different physical storage devices. A volume-level snapshot can be created simply by splitting and detaching a mirror containing an image of the data from the original volume. Once the user has completed use of the snapshot volume split from an original, it may be resynchronized (since continued updates to the original volume may have occurred) by reattaching it to the original. Subsequent snapshots may be taken in a similar manner.

While the volume level snapshot capabilities of a volume manager may be utilized to create a snapshot of a database object, several significant problems can be presented. Firstly, storage is typically managed by system administrators or storage administrators who have root privileges which may be required for invoking the snapshot capabilities of a volume manager. In many organizations, database administrators do not have root privileges. Accordingly, the system administrator and database administrator must typically work together to coordinate the database and its storage when creating a snapshot.

In addition, even if the database administrator were granted root privileges, they often do not have the storage management expertise to effectively utilize the snapshot functionality of the volume manager. Creation of a consistent frozen image for a database, especially large databases that use hundreds of disks, is a complicated process and may be error prone. A single error may render the entire frozen image useless.

SUMMARY OF THE INVENTION

A system and method for creating a snapshot copy of a database are provided. In one embodiment, a method for creating a snapshot copy of a database object includes creating a mirror of the database on a plurality of volumes. A user may provide a request to create a snapshot of a database object to a database utility. The database utility responds to the snapshot request by providing an indication of selected volumes of the mirror that correspond to the database object to a volume level snapshot provider, such as a volume manager. The volume manager then creates a snapshot volume for each of the selected volumes of the mirror.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
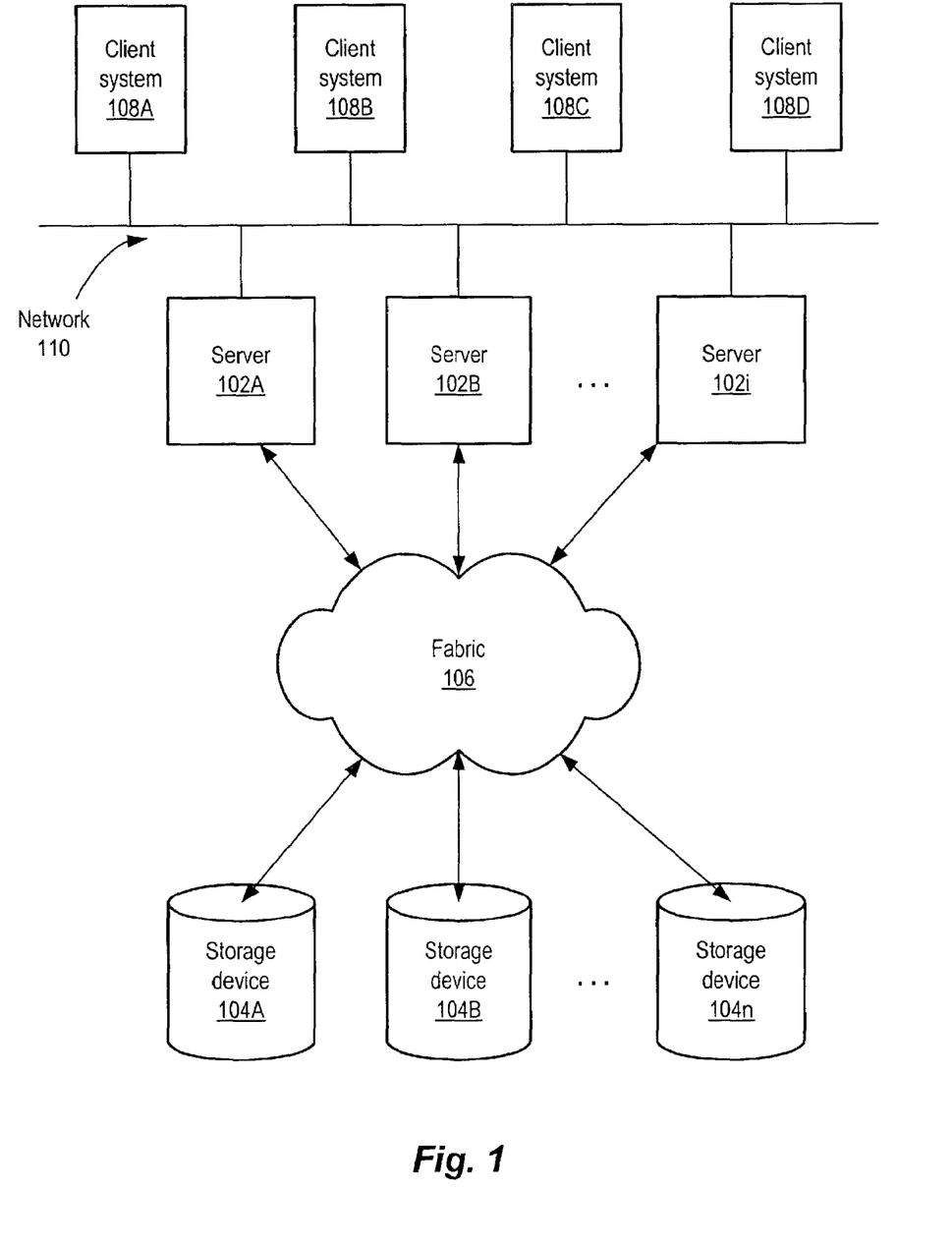
FIG. 1 is a block diagram of one embodiment of a computer system.

FIG. 1 illustrates an exemplary computer system in which embodiments of a database snapshot mechanism may be implemented. In the illustrated embodiment, a storage area network (SAN) environment is formed by one or more host systems or servers 102 (e.g. servers 102A, 102B and 102*i*) that are interconnected with one or more associated storage devices (e.g. storage devices 104A, 104B, . . . 104*x*) through an interconnect fabric 106. One or more client systems 108A-108D may access the SAN by accessing one or more of the servers 102 via a network 110. Network 110 may include wired or wireless communication mechanisms such as, for example, Ethernet, LAN (Local Area Network), WAN (Wide Area Network), or modem, among others.

Each of the storage devices 104 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Servers 102 may run any of a variety of operating systems, including, but not limited to, a UNIX™ operating system, Solaris operating system, or a Windows operating system. Each server 102 may be connected to the fabric 106 via one or more Host Bus Adapters (HBAs).

Fabric 106 includes hardware that connects servers 102 to storage devices 104. The fabric 106 may enable server-to-storage device connectivity through Fibre Channel switching technology. The fabric 106 hardware may include one or more switches (also referred to as fabric switches), bridges, hubs, or other devices such as routers, as well as the interconnecting cables (for Fibre Channel SANs, fibre optic cables), as desired.

In one embodiment, the SAN may use the Network File System (NFS) protocol to provide access to shared files on the SAN. Using NFS, each server 102 may include a logical hierarchy of files (i.e. a directory tree) physically stored on one or more of storage devices 104 and accessible by the client systems 106 through the server 102. These hierarchies of files, or portions or sub-trees of the hierarchies of files, may be referred to herein as "file systems." In one embodiment, the SAN components may be organized into one or more clusters to provide high availability, load balancing and/or parallel processing. For example, in FIG. 1, a selected set of the servers 102A, 102B . . . 102I may be operated in a cluster configuration.

Figure 2:
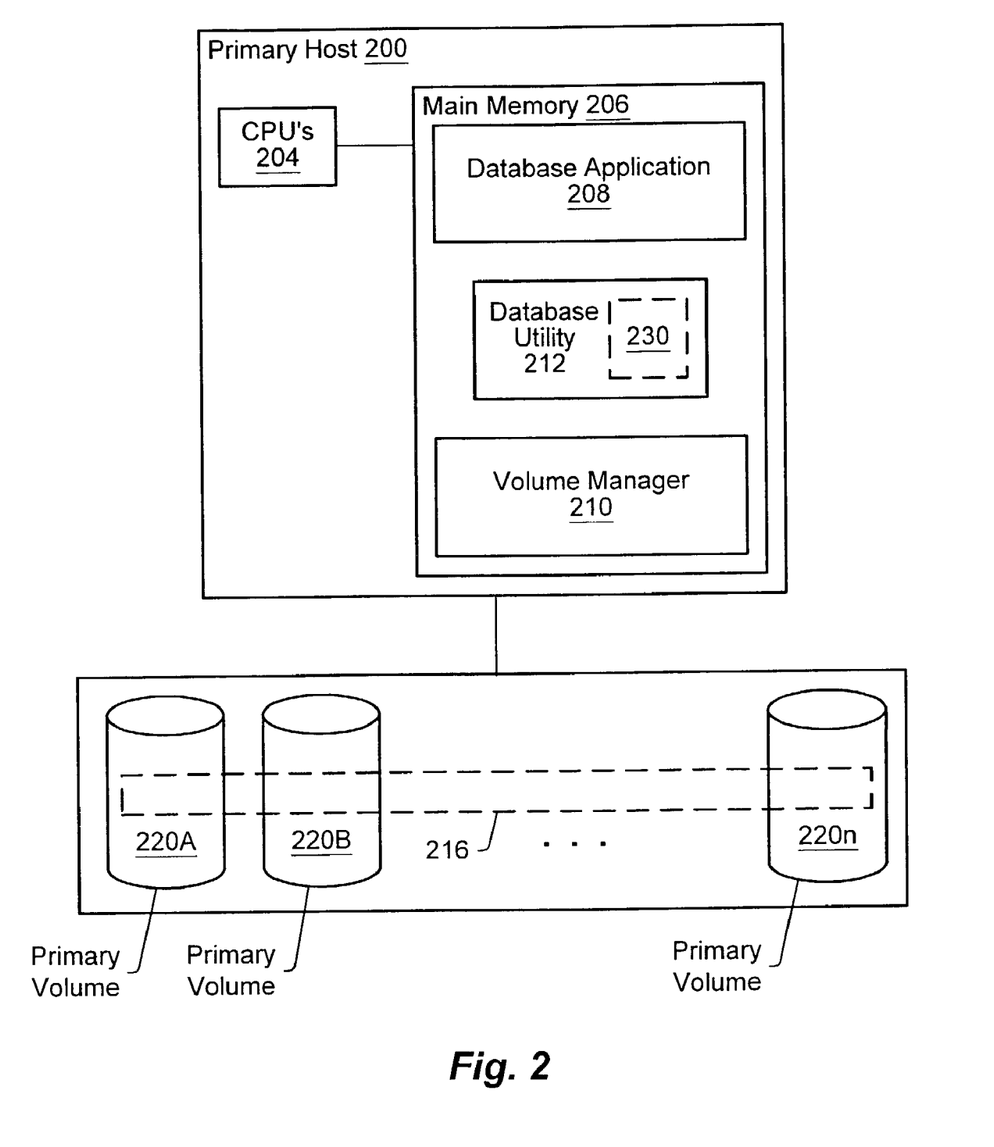
FIG. 2 is a block diagram illustrating a primary host coupled to a plurality of volumes.

FIG. 2 illustrates aspects associated with one of the servers 102, referenced as primary host 200. In general, primary host 200 may include various conventional software and hardware components, as desired. As such, primary host 200 is illustrated with one or more central processing units (CPUs) 204 as well as a main memory 206 for storing instructions and/or data accessible by the CPUs 204. In one embodiment, main memory 206 is implemented using dynamic random access memory (DRAM), although it is noted that in other embodiments, other specific types of memory, or combinations thereof, may be utilized.

FIG. 2 further illustrates various software components executable by CPUs 204 out of a memory medium such as main memory 206. The depicted software components include a database application 208, volume manager 210, and a database utility 212. It is noted that these software components may be paged in and out of main memory 206 from a secondary storage medium according to conventional techniques.

Database application 208 is provided to create and manage a database. In one embodiment, database application 208 is a relational database application. In other embodiments, database application 208 may be of other specific types, such as an object oriented database application. Database application 208 may be a commercially available database from a database vendor such as Oracle Corporation, Sybase Inc., DB3 Inc., or DBE Software. Database application 208 may alternatively be a customized database application.

The volume manager of FIG. 2 includes functionality to virtualize physical storage accessible by applications running on primary host 200. As used herein, the term "volume manager" broadly refers to host software that selects and combines storage space from more than one physical storage device into a logical volume. The volume manager 210 may support various specific storage management functionality, such as various levels of RAID functionality, including data mirroring and striping. In one embodiment, the volume manager is a Veritas Volume Manager™ product available from Veritas Software Corporation.

As illustrated in FIG. 2, database application 208 manages a database 216 containing data that spans across multiple volumes, depicted as primary volumes 220A-220n. Each primary volume 220 may be accessed by database application 208 through the virtualization functionality provided by volume manager 210. It is noted that each primary volume 220 corresponds to a partitioning of physical storage such as the storage of storage devices 104 of FIG. 1. A volume may be formed by a portion of the overall storage of a physical device, by the storage of an entire physical device, or by the storage of multiple physical storage devices combined. For example, each primary volume may comprise an array of storage devices 104, as desired.

Figure 3:
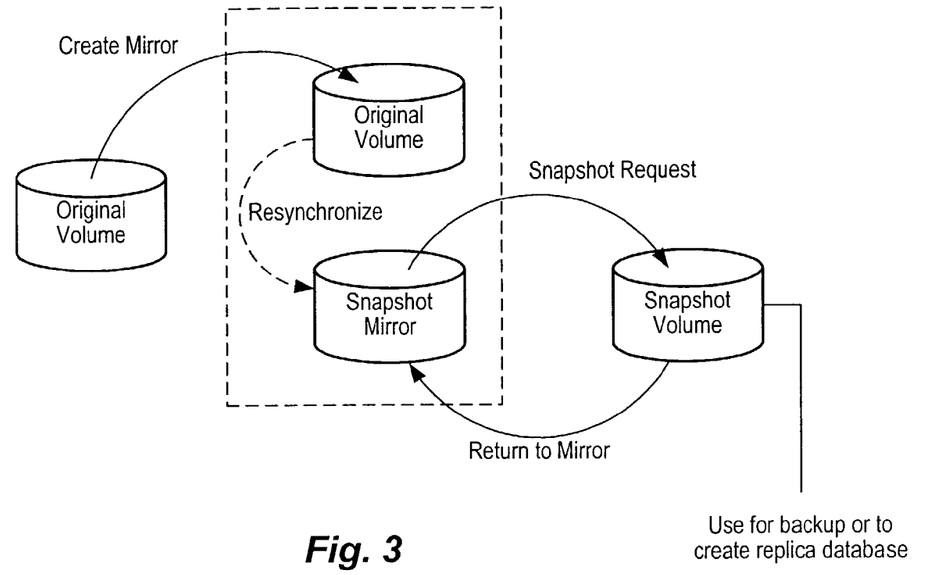
FIG. 3 is a diagram depicting volume level snapshot functionality of a volume manager.

Volume manager 210 includes functionality to create a snapshot volume corresponding to an original volume, upon request. FIG. 3 illustrates one implementation of this volume-level snapshot functionality. As shown, a command (or multiple commands) may be executed by volume manager 210 to create a snapshot mirror of an original volume. Once the snapshot mirror is created, a snapshot request may be executed by the volume manager to create the snapshot volume. The snapshot volume may then be used independently of the original volume. For example, the snapshot volume may be mounted on a separate host and used for backup or to create a replica database. Upon completion of use of the snapshot volume, volume manager 210 may additionally include functionality to return the volume snapshot to the primary volume and to resynchronize the snapshot mirror.

Referring back to FIG. 2, a user or administrator of database application 208 may desire that a snapshot of a database object be made. For example, the administrator may desire that a snapshot be made of the entire database 216, of specific table spaces of the database 216, or of individual tables of the database 216. A database object is in general an entity of a database. To facilitate this operation, the storage is initially configured by the system administrator and/or the database administrator such that a snapshot mirror is created for each of the primary volumes 220 containing data associated with the database. Database utility 212 is provided to receive a snapshot request from the user or administrator to create a snapshot of a database object. Database utility 212 is executable to respond to the snapshot request by accessing storage layout information 230 which includes information that correlates the database object to specific volumes upon which the database object is stored. The database utility 212 then quiesces the database object and invokes the volume manager 210 to create a snapshot volume for each of the volumes that contains portions of the database object. The snapshot volumes can subsequently be used for backup and/or deported to another host for use by a clone database. Since the user or database administrator need not indicate the specific volumes associated with the database object when the snapshot is requested, the creation of the snapshot copy may be greatly simplified. Further details regarding these operations are provided in further detail below.

Figure 4A:
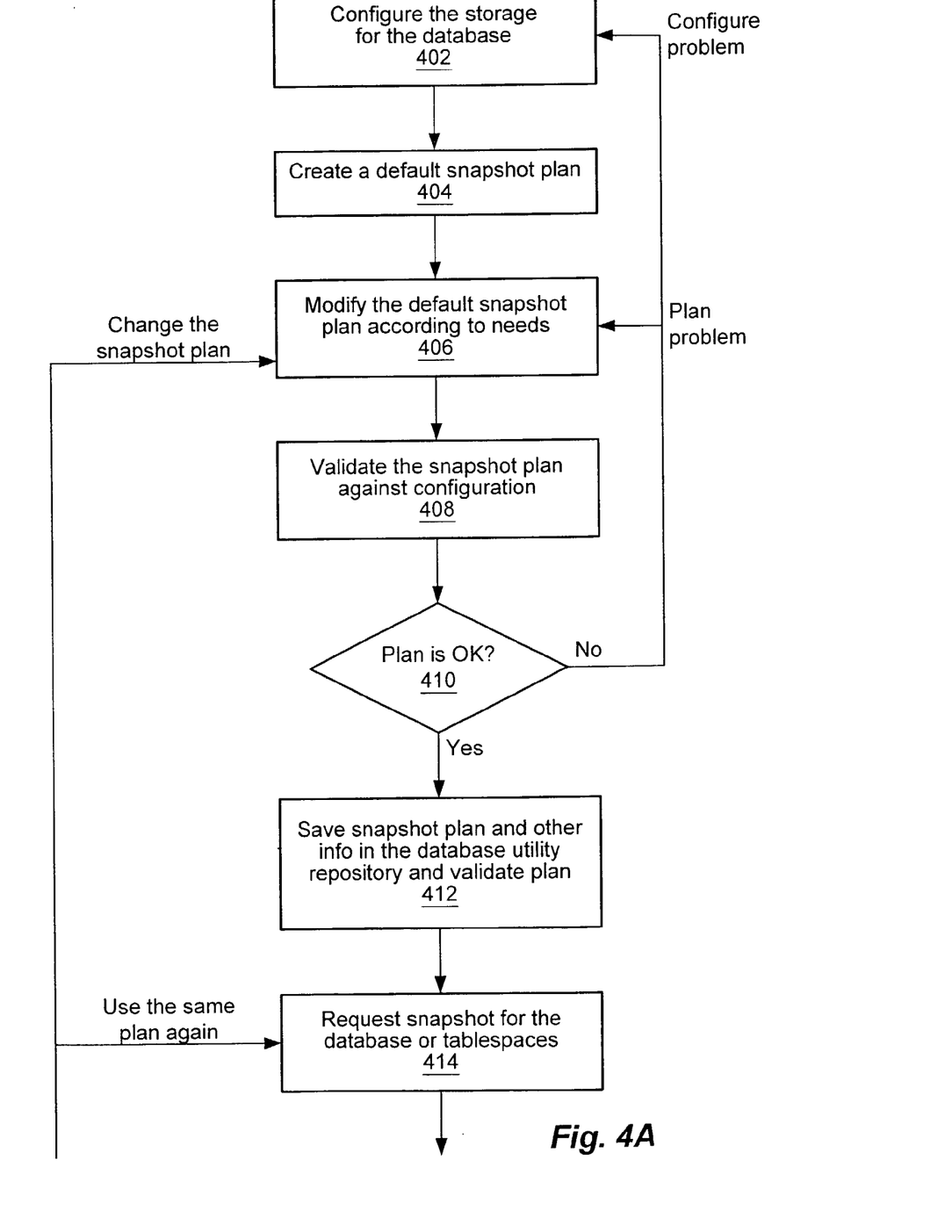
FIGS. 4A and 4B are flow diagrams illustrating operations of database object snapshot functionality according to one embodiment.
Figure 4B:
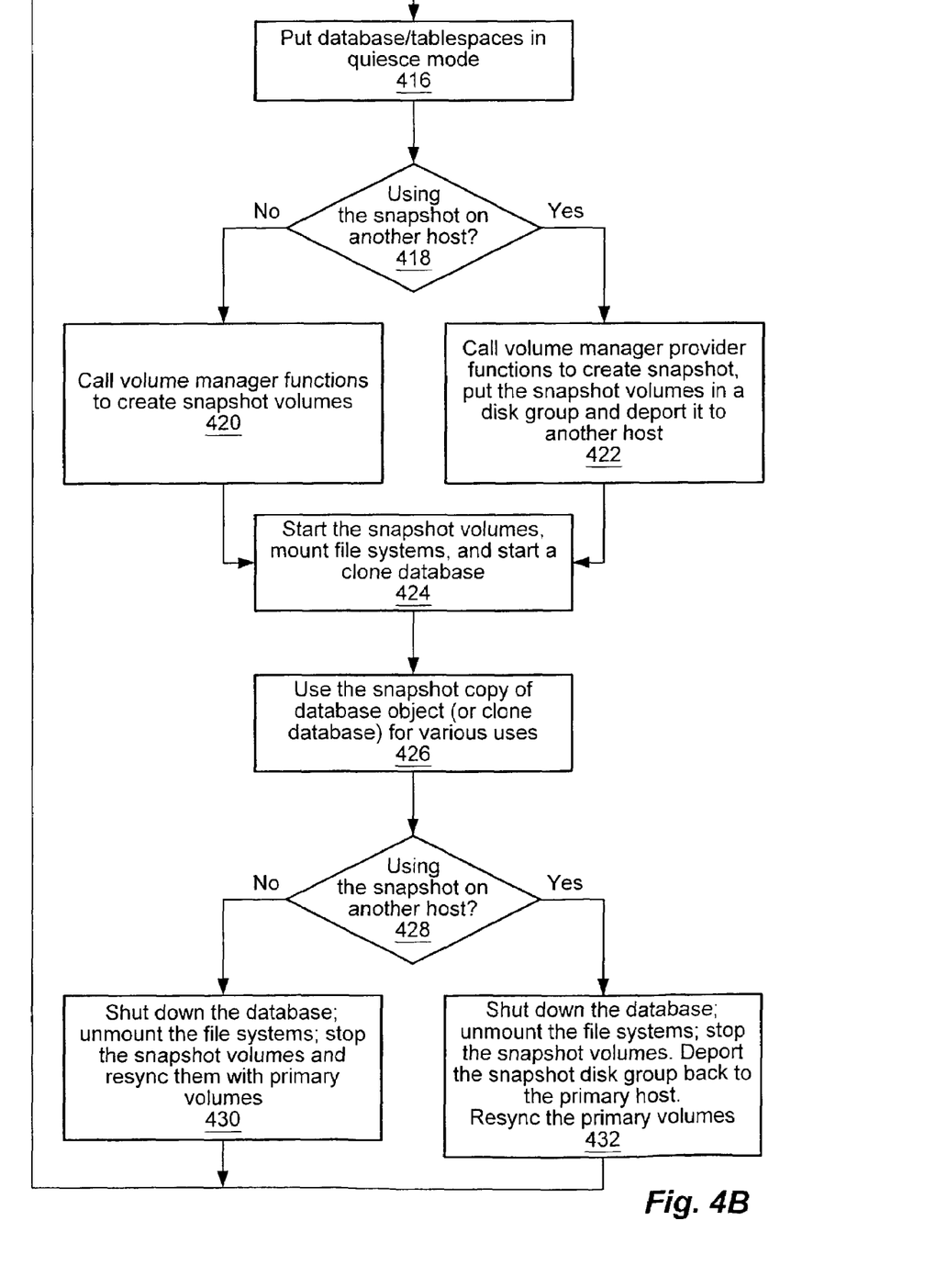
Figure 5:
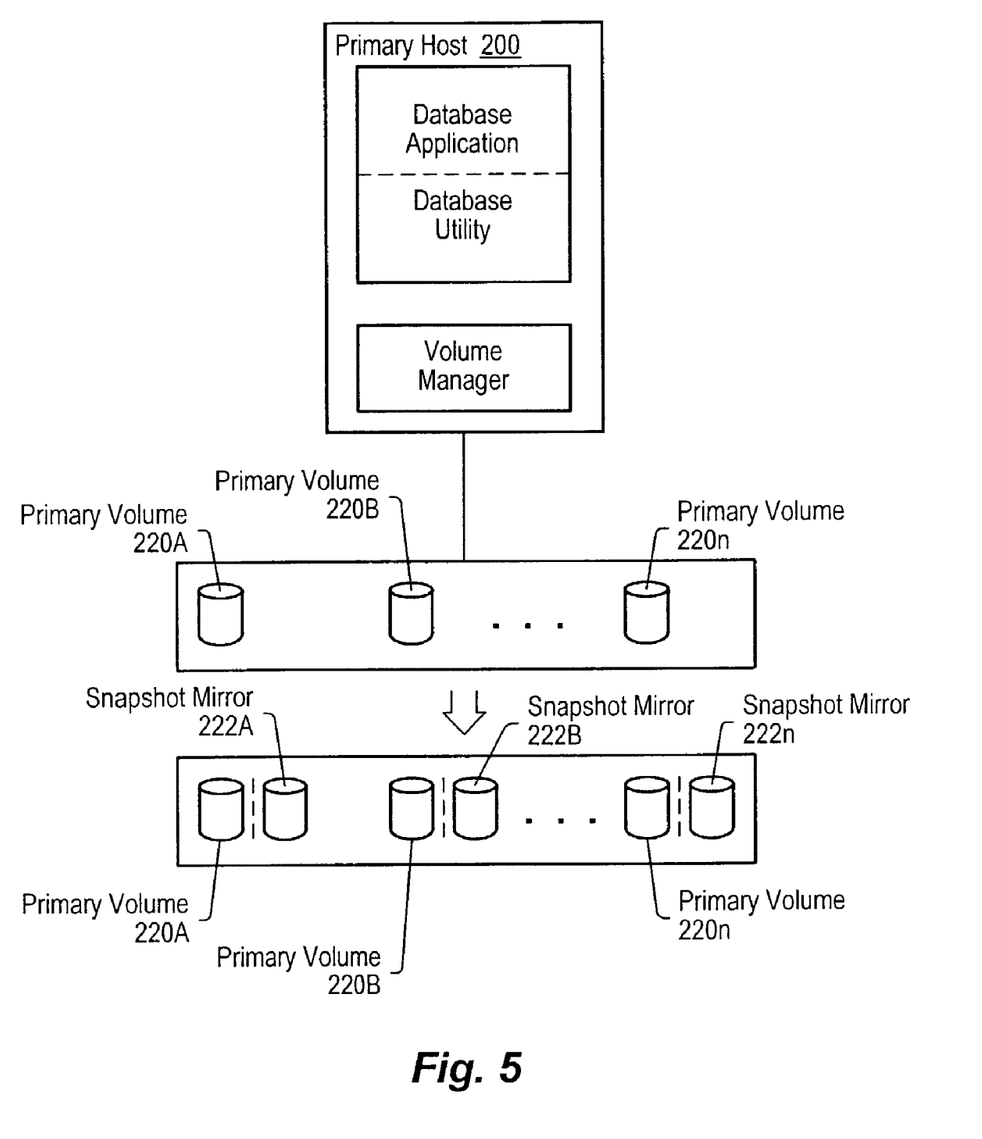
FIG. 5 is a block diagram illustrating creation of a snapshot mirror for each of a plurality of primary volumes.

FIGS. 4A and 4B illustrate operations associated with one embodiment of the database snapshot functionality generally discussed above. In step 402, the storage for the database is configured. In this step, the system administrator and database administrator may act together to create the desired storage volumes for the database using volume manager 210. The storage configuration is initially set up such that each primary volume 220 is mirrored to support the volume-level snapshot functionality of volume manager 208, as discussed above. Thus, as illustrated in FIG. 5, after the storage is configured, a snapshot mirror (222A-222n, respectively) is created for each primary volume 220. It is noted that in one particular implementation, this is the only step that may require root permissions.

In step 404, a default snapshot plan may be created. The default snapshot plan may be in the form of a text file which may be easily edited by a standard text editor. The snapshot plan may include a set of parameter names/default values that are used to control the snapshot functionality of database utility 212. Specific parameters names and/or default values in the default snapshot plan, and may be based on the specific database that is running.

Figure 6:
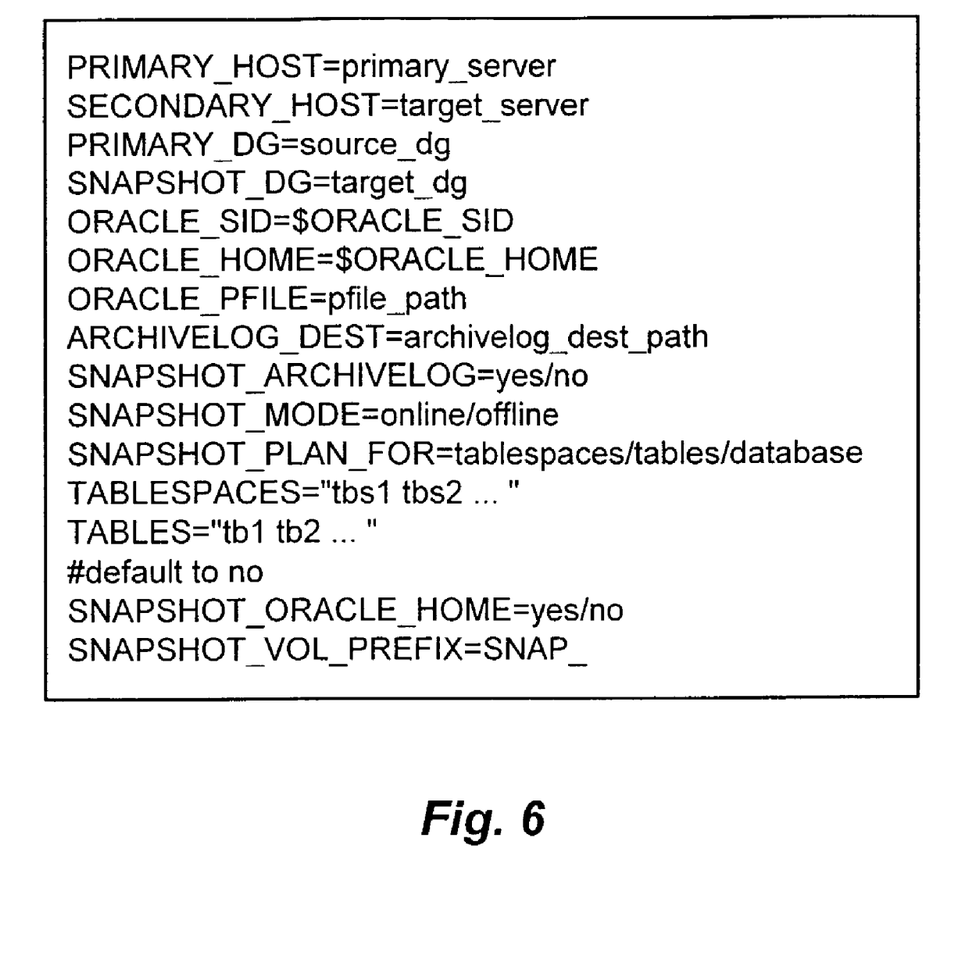
FIG. 6 is a diagram illustrating a default snapshot plan.

FIG. 6 illustrates an exemplary default snapshot plan. The parameter names contained in this default snapshot plan correspond to the following brief descriptions:

PRIMARY_HOST—specifies primary host.
SECONDARY_HOST—specifies secondary host.
PRIMARY_DG—specifies disk group that contains volumes used by database.
SNAPSHOT_DG—specifies name of disk group for snapshot volumes.
ORACLE_SID—identifies database.
ORACLE_HOME—specifies location of database application binaries.
ORACLE_PFILE—specifies running characteristics of database for clone.
ARCHIVELOG_DEST—indicates location of archive log.
SNAPSHOT_ARCHIVELOG—turn on or off archive log.
SNAPSHOT_MODE—indicates whether snapshot will be performed while database is running
SNAPSHOT_PLAN_FOR—identifies snapshot object.
SNAPSHOT_ORACLE_HOME—specifies whether copy of database application is made.
SNAPSHOT_VOL_PREFIX—for snapshot naming convention.

In step 406, the default snapshot plan may be modified, as desired, depending upon the specific needs of the user or administrator. For example, the user may modify the default snapshot plan by indicating specific table spaces for which a snapshot copy will be desired, or a specific secondary host name to which the snapshot copy is to be deported (as discussed below). These settings may vary depending upon the implementation.

In step 408, the snapshot plan is validated against the current storage configuration. If a problem with the snapshot plan exists (step 410), the storage for the database may be reconfigured in step 402. Alternatively, the snapshot plan may be invalid due to another type of error, such as a syntax error. In this case, the default snapshot plan may be further modified in step 406.

If the snapshot plan is validated in step 410, the snapshot plan is stored in a repository associated with the database utility, along with various other information, as needed, such as control files or other metadata. In step 414, the user or database administrator initiates a command to request a snapshot. In one embodiment, database utility 212 responds to the snapshot request in accordance with the snapshot plan information stored in the repository. As stated previously, the snapshot plan information may include an identification of the database object to be copied, along with other pertinent information such as the names of the primary and secondary servers, disk groups, etc. It is noted that in other embodiments, a snapshot plan may not be created or stored in a repository. In such embodiments, parameters associated with a snapshot request may be provided directly via command line requests or through a graphical user interface (GUI).

In step 416, the database utility 212 places the database object for which a snapshot has been requested in quiesce mode (or backup mode) to insure a consistent storage level snapshot. When the database object is placed in the quiesce mode, updates to the database object may be temporarily halted.

Figure 7:
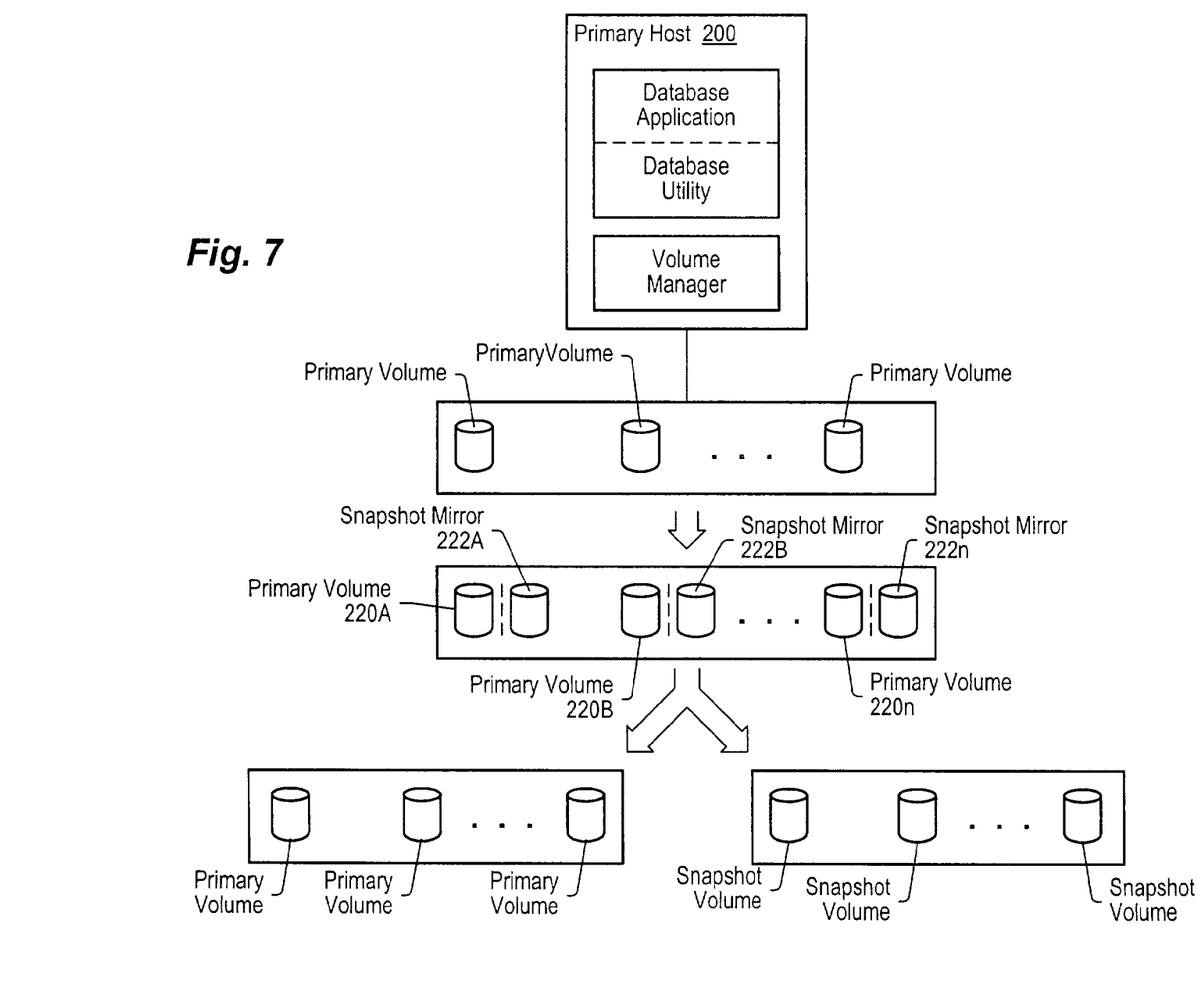
FIG. 7 is a block diagram illustrating creation of a plurality of snapshot volumes.
Figure 8:
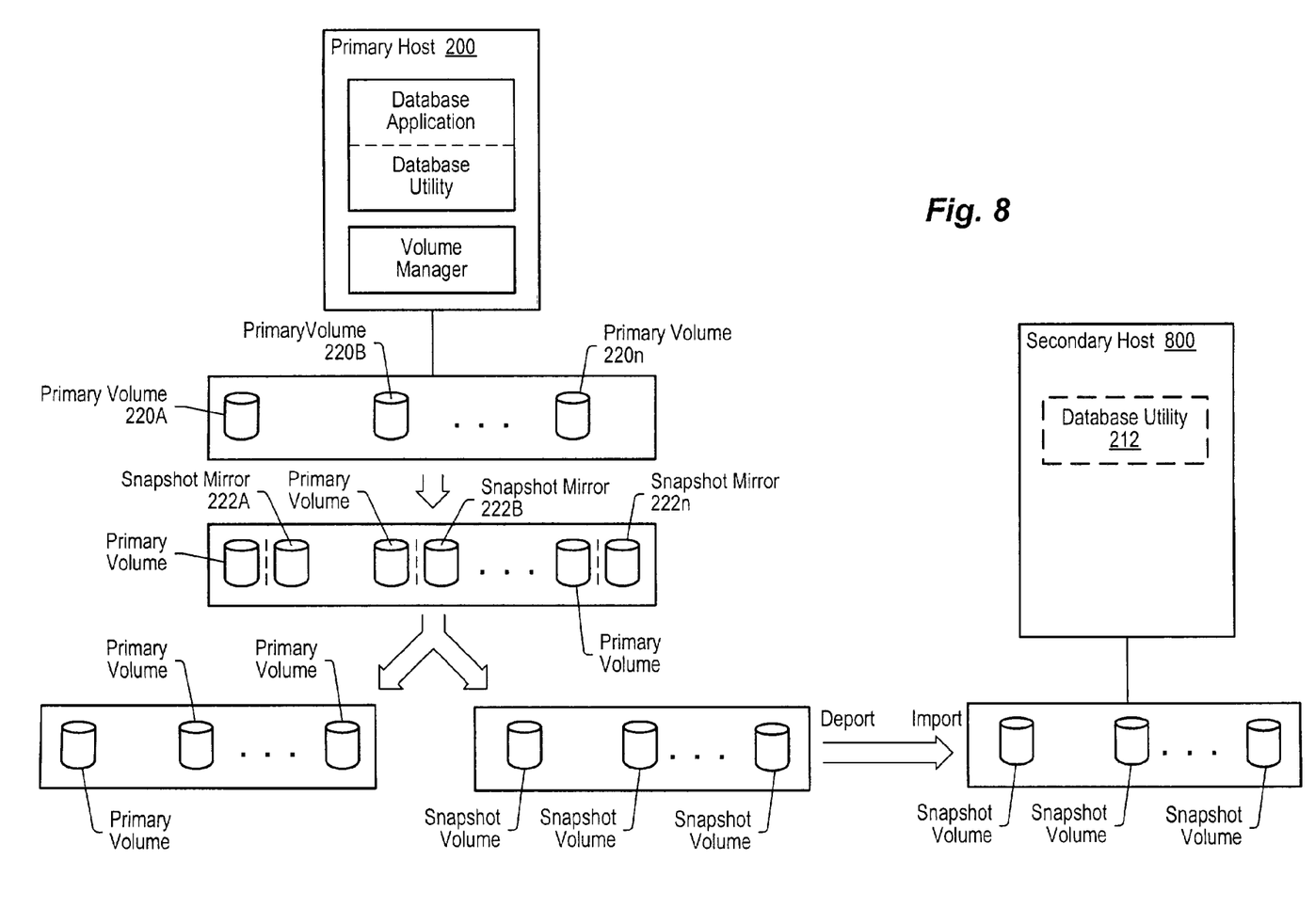
FIG. 8 is a block diagram illustrating the deportation of a disk group containing a plurality of snapshot volumes from a primary host.

If the snapshot is not to be used on another host (step 418), the database utility 212 calls the volume manager 210 to create a snapshot volume for each of the volumes that contains data associated with the database object in step 420. FIG. 7 illustrates creation of these snapshot volumes. If the snapshot is to be used on another host, the database utility 212 calls the volume manager to create a snapshot volume for each of the volumes that contains data associated with the database object, places each of the snapshot volumes into a disk group, and deports the disk group to the secondary host in step 422. FIG. 8 illustrates the deportation of the snapshot volumes to a secondary host 800. It is noted that in one embodiment, the database utility 212 may invoke the volume manager 210 to create a snapshot volume by providing a call to a volume manager provider through an object bus. After the snapshot volumes have been created, the database utility 212 may unquiesce the database object.

In step 424, database utility 212 causes the snapshot volumes to be started and the file systems for the snapshot volumes to be mounted. A clone database may further be started. It is noted that for instances where the snapshot is to be used on a secondary host, aspects of the functionality associated with database utility 212 depicted in step 424 may be executed on the secondary host.

In step 426, the snapshot of the database object may be used for a variety of specific purposes, as desired. For example, the snapshot of the database object may be used to create a backup. Alternatively, the snapshot of the database object may be used for reporting and analysis, application testing, etc.

In one particular implementation, the code executed by the database utility 212 to create the snapshot volumes in steps 420 or 422 may utilize the setuid command of the UNIX™ platform. This command is used in order to assume the root privileges required to invoke the snapshot functionality of the volume manager. In this manner, intervention of a user having root privileges, such as a system administrator, is not needed at the time the snapshot copy of the database object is requested and created.

When operations of the snapshot copy or clone database are completed, and if the snapshot was not deported to another host (step 428), the database utility 212 may operate to shutdown the clone database (if it was started for the snapshot), to unmount the file systems associated with the snapshot volumes, and to stop the snapshot volumes (step 430). The database utility 212 additionally invokes the volume manager to resynchronize the snapshot volumes with the primary volumes.

Figure 9:
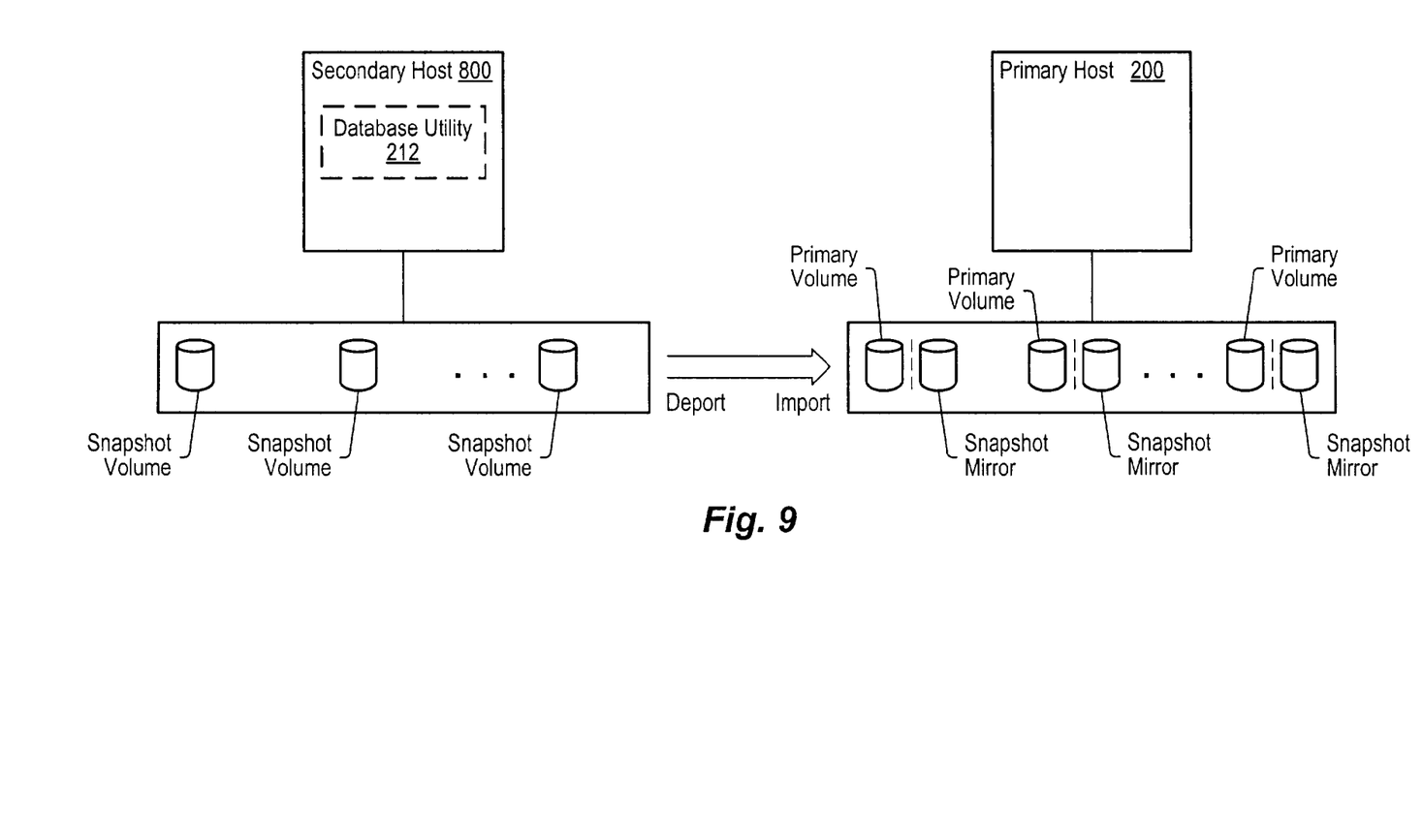
FIG. 9 is a block diagram illustrating the deportion of a plurality of snapshot volumes from a secondary host.

On the other hand, if the snapshot was deported to another host, the database utility 212 operates to shutdown the clone database (if it was created for the snapshot), to unmount the file systems associated with the snapshot volumes, and to stop the snapshot volumes. In addition, the database utility 212 operates to deport the snapshot disk group back to the primary host 200. These operations of database utility 212 may be performed in response to portions of the database utility code executing on the secondary host 800. The database utility 212 may additionally cause the snapshot volumes 222 to be resynchronized with the primary volumes 220. The result of this process is illustrated in FIG. 9.

In one particular embodiment used in association with an Oracle database, the snapshot functionality associated with database utility 212 may be invoked by a set of commands. These commands include:

FlashSnap configuration check—dbed_vmchecksnap

Snapshot a database or tablespace/snapback to original—dbed_vmsnap -o snapshot|resync Clone database—dbed_vmclonedb -o mount|mountdb|recoverdb|umount undo—dbed_vmsnapundo Appendix A contains specific details regarding an implementation of these commands.

It is noted that while in the embodiments described above, primary host 200 may be coupled to a plurality of storage devices through a storage area network, other embodiments are possible in which primary host 200 is coupled directly to dedicated storage devices. In addition, it is noted that while in the embodiments described above, the functionality of database utility 212 is illustrated separate from the database application 208, in other embodiments, the functionality of the database utility 212 may be incorporated as an integral portion of a database application.

It is additionally noted that while in the above embodiments database utility 212 provides snapshot requests to a volume manager that creates volume-level snapshots, in other embodiments other volume-level snapshot providers (e.g., code associated with the file system, etc.) may be invoked by database utility 212 to create the necessary volume-level snapshots.

Various embodiments may further include receiving, sending or storing instructions and/or data that implement the database snapshot functionality in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

APPENDIX A

This appendix includes details of one implementation of three commands according to one embodiment: dbed_vmchecksnap, dbed_vmsnap and dbed_vmclonedb, including a description of the purpose and syntax for each command and pseudo-code for each of the commands.

Snapshot Configuration Check—dbed_vmcheckvnap

The dbed_checkvmsnap command has options to do checking and validating database utility repository. Configuration validate will validate and then produce a report. Configuration update will save a snapshot plan, ASCII Oracle backup control file, Oracle pfile, and Oracle ifile into vxdba repository. Snapshot plan and Oracle related files can then be used many times for other snapshot related operations if there is no database structure and snapshot plan requirement change.

The following items may be checked:
1. For tablespace snapshot scenario, tablespace(s) to be snapped should be on volumes that are not shared with other volumes for other tablespaces.
2. /etc/vx/vxdba should be on shared disk and there should be DCO logs (persistent) created.
3. database should be in archive log mode for online snapshot. Archive mode is not required for offline snapshot.
4. Oracle pfile and ifile will be copied into database utility repository.
5. All volumes used by database or the volumes used by tablespaces or tables must be in a single disk group. For additional volumes to be snapshot, users need to update snapshot plan manually after snapplan is updated.

Syntax:
dbed_vmchecksnap
  Usage:
    dbed_vmchecksnap -S ORACLE_SID -H ORACLE_HOME -f
    snapplan -o setdefaults[,validate]-t SECONDARY_HOST [-n]
    dbed_vmchecksnap -S ORACLE_SID -H ORACLE_HOME -f
    snapplan -o validate [-F|-n]
  where
    -S ORACLE_SID: ORACLE_SID
    -H ORACLE_HOME: ORACLE_HOME
    -f snapplan: specifies snapshot plan file.
    -o setdefaults[,validate]: setdefaults will fill in snapplan defaults. validate will produce a report and update vxdba repository.
    -o o validate [-F|-n]: Specify -F to force update vxdba repository. Specify -n to check whether snapplan has been updated or not.
    -t target_server: used when -m setdefaults is used to specify target server.

Pseudo Code:
  display usage if switch or required parameters are not specified.
  exit if SIG license feature "VM snapshot" is not turned on.
  exit if database is not up.
  exit if Oracle release is not supported
  if ("-m setdefaults" is specified) {
    set SOURCE_SERVER to current server;
    set TARGET_SERVER to "-t target_server" argument;
    set ORACLE_SID;
    set ORACLE_HOME;
    query ORACLE for pfile location;
    query ORACLE for datafiles, find diskgroup for them.
      Prompt warning
    if multiple diskgroups are found.

```
set default SNAP_DG to SNAP_<original_dg>;
default SNAPSHOT_MODE to online;
default SNAPSHOT_PLAN to database;
default ORACLE_REMOTE_ARCHIVE_LOG to no;
default TABLESPACES and TABLES to null;
default SNAPSHOT_ORACLE_HOME to no;
default SNAPSHOT_VOL_PREFIX to SNAP_;
find VXDBA_REPOSITORY volume name if source
    and target server are different;
default VALIDATED to no;
exit;
}
if (snap shot_plan for == tablespaces) {
    select unique file_name from sys.dba_data_files where
        tablespace_name
=
    '...' or tablespace_name ='...' or ...;
}
else if (snapshot_plan_for == tables) {
    select file_name from sys.dba_data_files a, sys.dba_t-
        ables b where
    a.tablespace_name = b.tablespace_name and
    (b.table_name = '...' or b.table_name = '...' or ...);
else
    use vxdba repository include file as file list
end_if
build file system list(1), [file system, volume, diskgroup,
    mount_options],
from the previous file list
add to file_system_list(1) if (snapshot_oracle_home ==
    yes)
Find diskgroups and verify against *one* diskgroup
    policy. verify diskgroup version to be 90 or above.
foreach volumes in file system list(1)
    verify fastresync flag (vxprint -g OTHERdg
        -F%fastresync vol2)
    verify DCO log (vxprint -g PRODdg -F%hasdclog
        u003vol)
    /*
        need to find a way to find out what volumes still
            running vxassist snapstart...
        check for vrts_vxvm_plex.vxvmstate and the status
            should be equal to 5, snapready.
        see megami:/project/vmprov/3/tree/db/vs_plex.h for
            complete definition
    */
    print warning if vxassist .. snapwait... returns snapshot
        is not ready to take.
    separate snapshot volumes and their associated dco
        logs from original volumes used
    by oracle and vxdba repository. Find disks used by snap
        related volumes and the disks
    used by rest of volumes. These two disk collections
        should not have overlaps.
end_foreach
if (snapshot_mode == online) {
    Verify database is running on archive log mode.
    if (ORACLE_WILL_SHIP_ARCHIVELOG == no) {
        Verify archivelog_dest;
    }
}
if (snapshot_oracle_home == yes) {
    Verify $ORACLE_HOME and make sure it is in file
        system list(1).
    Set proper error message if it is not.
}
if ("ORACLE_PFILE" is not given in snapplan file) {
    Locate Oracle pfile via $ORACLE_HOME/dbs,
        $ORACLE_PFILE
    if it exists in either one of locations above, fill in
        ORACLE_PFILE parameter into snapplan
    otherwise, set proper error message
}
if (-o update) {
    retrieve file system mount options from vfstab and save
        it to snapplan.mnttab_list
    save tbs list to snapplan.tbs_list
    // note, these two files st_mtime has to be newer than
        snapplan itself.
    use vxsnapadm -o mtime file to get st_mtime for each
        file.
}
else {
    print a report
}
```

Create a Snapshot—dbed_vmsnap

This command creates snapshot volumes from the primary host for either entire database or tablespace(s).

Syntax:
    #dbed_vmsnap
    Usage:
        dbed_vmsnap -S ORACLE_SID -f snapplan -o snapshot
        dbed_vmsnap -S ORACLE_SID -f snapplan -o resync
    where
        -S ORACLE_SID: ORACLE_SID
        -f snapplan: specify snapplan file
        -o snapshot|resync: to create a snapshot or resynch with
            original volumes.

Pseudo Code:
```
owner should be root. set uid should be turned on for this
    command.
exit if SIG license feature "VM snapshot" is not turned
    on.
exit if /etc/vx/vxdba/<ORACLE_SID>/snapplan/<snap-
    plan> file does not exist
there should be 3 files in this directory: <snapplan>,
<snapplan>.mnttab_list, and <snapplan>.tbs_list
read snapshot plan files
exit if invalid CLI option is specified
if ("-o snapshot") {
    /* snapstart should be started for all volumes */
    if (SNAPSHOT_PLAN_FOR == database or SNAP-
    SHOT_PLAN_FOR == tablespaces or
    SNAPSHOT_PLAN_FOR == tables) {
        if (DATABASE_MODE == online and database is
            online) {
            for all tablespaces in [hotbackup_table list_begin
                and hotbackup_table_list_end] {
                put tablespace into backupmode
            }
        }
        else if (DATABASE_MODE == offline and database is
            offline) {do nothing;
        }
        else {
            exit with proper error code
        }
    }
    else {
        exit with "invalid snapplan file"
    }
```

```
/* wait for all volumes' snapshot status become ready */
foreach volume in snapshot_list {
    call vm provider to perform vm related tasks.
    vxassist -g source_dg snapwait volume
    vxassist -g source_dg snapshot volume if (volume <>
        archivelog_dest_volume)
    undo changes to database or tablespaces if there is any
        error.
{
issue SQL statements to end backup database or
    tablespaces
issue SQL statements to force switch log twice
vxassist -g source_dg snapshot archivelog_dest_volume
    if backup mode is used.
create ascii backup control file and save it to
    dbed_vmsnap.backupcontrolfile_ascii.<snap_dg> into
    vxdba repository.
save a copy of pfile and optional ifile to vxdba repository.
store snapshot plan into /etc/vx/vxdba/<SID>/snapplan/
    lastsnapshotplan (to be used by dbed_vmclonedb).
find VxDBA repository volume and do vxassist -g
    source_dg snapshot VxDBA_volume
VM provider: vxdg split source_dg target_dg vol .....
if ("-o deport" is specified) {execute "vxdg deport tar-
    get_dg" and check return code}
}
else if ("-o resync") {
    vxdg import <deported_dg>
    vxdg join deported_dg original_dg
    foreach volume in snapshot plan {
        vxrecover -g original_dg -m SNAP-volume
        vxvol -g original_dg start SNAP-volume
        vxassist -g original_dg snapback SNAP_volume
    }
}
```

Offhost Processing—dbed_vmclonedb

This command should be running on the target host.

Syntax:
```
# dbed_vmclonedb
Usage:
    dbed_vmclonedb -S ORACLE_SID -g snap_dg -o
mount|mountdb|recoverdb,new_sid=new_sid[,
    vxdbavol=vol_name] [-H ORACLE_HOME] [-r relo-
    cate_path]
    For the same host, -r relocate_path is required.
    For offhost, -o vxdbavol=vol_name is required.
    --------------------------------------------------
    dbed_vmclonedb -o umount,new_sid=new_sid [-r relo-
        cate_path] [-H ORACLE_HOME]
-S ORACLE_SID: ORACLE_SID
-f snapplan: specify snapplan file
-r relocate_path: new database relocate path. This is a
    required if snapplan is for a single host processing.
-g snap_dg: target disk group to be imported.
-S NEW_ORACLE_SID: new database instance name
-H ORACLE_HOME: ORACLE_HOME
-o vxdbavol=...: volume name for vxdba repository. This
    volume name should be like "SNAP_vxdba_volume"
-o
mount|mountdb|recoverdb|umount,new_sid=new_sid[,
    vxdbavol=vol_name ]:
    to mount file systems, or to mount file systems and
        startup database, or to mount file systems and auto
        recover clone database.
    New oracle sid is required.
```
vxdba volume is required for offhost processing,
    optional for single host processing.
-o umount,new_sid=new_sid: to shutdown Oracle data-
    base then umount
FS. Deport diskgroup if necessary.
    "new_sid=ORACLE_SID" is required.

Pseudo Code:
```
exit if SIG license feature "VM snapshot" is not turned
    on.
Validate command line switches
if (-o option <> umount) {
    vxdg import <snap_dg>
    validate vxdbavol with <snap_dg> child objects
        through VM provider.
    vxrecover -g snap_dg -m vxdbavol
    fsck -F vxfs /dev/vx/rdsk/<snap_dg>/vxdbavol
    mount -F vxfs /etc/vx/dsk/<snap_dg>/<SNAP-vxd-
        bavol>
<temporary_mount point>
    copy required files (snapplan, ascii control file, ...) to
/etc/vx/vxdba/<NEW_SID>/snapplan/*
    umount <temporary_mount_point>
    find snapplan from file
'/etc/vx/vxdba/<NEW_SID>/snapplan//lastsnapshotplan'
    Read snapplan from /etc/vx/vxdba/ ...
    /*
        we can mount {SNAP_vxdba_repository} to a tem-
            porary FS to read snapplan and copy required files
            into
        /etc/vx/vxdba. The argument is this directory may
            already exists and there could be some other files
            needed
        for other application.
    */
    Validate <TARGET_SERVER> with current running
        server. Exit if they are not match.
}
if (-o option <> umount) {
    /* snap_dg should be imported already */
    find all volumes associated with this <snap_dg>
    foreach volume in snapshot plan {
        vxrecover -g target_dg -m volume if (volume <>
            vxdba_vol)
    }
    vxvol -g <snap_dg> startall
    if (-o mount or -o mountdb or -o recoverdb) {
        foreach volume {
            fsck -F vxfs /dev/vx/rdsk/<target_dg>/SNAP-vol-
                ume
            mkdir -p mount_point if (dirname(mount_point)
                does not exist)
            mount -F vxfs /dev/vx/dsk/<target_dg>/SNAP-
                volume
            mount_point
            exclude vxdbavol repository volume
            // exit if any error detected
        }
    }
    if (-o mountdb or -o recoverdb) {
        read backup control file and update ORACLE_SID
            with NEW_ORACLE_SID
        update control files, log_archive_start, archivelog_d-
            est from pfile or ifile
        turn off archive log
        update datafile path if (-r relocate_path)
        << create init<NEW_ORACLE_SID>.ora file>>
```

```
// verify whether password file is required or not
<< create orapw<NEW_ORACLE_SID> password
    file>>
execute modified ASCII backup control file using
    sqlplus
if (-o recoverdb) {
    execute recover database and alter database open
        resetlogs statements
    }
  }
}
else if (-o umount) {
    if (<NEW_ORACLE_SID> is up and running) then
        if (-o shutdown is specified) then
            shutdown database
            bail out if shutdown failed.
        else
            bail out
        endif
    endif
    foreach file_system in snapshot list {
        umount /mount_point
        rm -r file_system /* may not want to do that */
    }
    if (-o deport is specified) then
        vxdg deport <target_dg>
    endif
}
```

What is claimed is:

1. A method comprising:
configuring storage for a database as a plurality of mirrored volumes, wherein each volume of the plurality of mirrored volumes includes a primary volume and a snapshot mirror of the corresponding primary volume, wherein each snapshot mirror comprises a mirror of the corresponding primary volume that is configured to store a copy of the corresponding primary volume at a point in time;
a user providing a snapshot request to create a snapshot of a database object to a database utility;
the database utility responding to the snapshot request by providing an indication of selected volumes of the plurality of mirrored volumes that correspond to the database object to a volume-level snapshot provider;
the volume-level snapshot provider creating a respective snapshot volume corresponding to each of the selected volumes using the snapshot mirror of the selected volume.

2. The method for creating a snapshot copy as recited in claim 1 wherein the database utility accesses storage layout information to determine the selected volumes in response to the snapshot request.

3. The method for creating a snapshot copy as recited in claim 1 further comprising the database utility creating a default snapshot plan, wherein said default snapshot plan includes parameters for creating the snapshot.

4. The method for creating a snapshot copy as recited in claim 3 wherein the default snapshot plan is a text file.

5. The method for creating a snapshot copy as recited in claim 1 further comprising quiescing the database object in response to the snapshot request.

6. The method for creating a snapshot copy as recited in claim 5 further comprising unquiescing the database object after creating the respective snapshot volume corresponding to each of the selected volumes.

7. The method for creating a snapshot copy as recited in claim 1 further comprising the database utility creating a deportable disk group that includes the snapshot volumes corresponding to each of the selected volumes.

8. The method for creating a snapshot copy as recited in claim 7 further comprising deporting the disk group from a primary host to a secondary host.

9. A computer system comprising:
one or more microprocessors;
a memory coupled to the one or more microprocessors, the memory including program instructions executable to implement the method of:
configuring storage for a database as a plurality of mirrored volumes, wherein each volume of the plurality of mirrored volumes includes a primary volume and a snapshot mirror of the corresponding primary volume, wherein each snapshot mirror comprises a mirror of the corresponding primary volume that is configured to store a copy of the corresponding primary volume at a point in time;
a database utility receiving a snapshot request from a user to create a snapshot of a database object;
the database utility responding to the snapshot request by providing an indication of selected volumes of the plurality of mirrored volumes that correspond to the database object to a volume-level snapshot provider such that the volume-level snapshot provider creates a respective snapshot volume corresponding to each of the selected volumes using the snapshot mirror of the selected volume.

10. The computer system as recited in claim 9 wherein the method further comprises the database utility accessing storage layout information to determine the selected volumes of the plurality of mirrored volumes that correspond to the database object in response to the snapshot request.

11. The computer system as recited in claim 9 wherein the method further comprises the database utility creating a deportable disk group that includes the snapshot volumes corresponding to each of the selected volumes.

12. The computer system as recited in claim 11 wherein the method further comprises deporting the disk group from a primary host to a secondary host.

13. A computer readable storage medium including program instructions executable to implement a method of:
configuring storage for a database as a plurality of mirrored volumes, wherein each volume of the plurality of mirrored volumes includes a primary volume and a snapshot mirror of the corresponding primary volume, wherein each snapshot mirror comprises a mirror of the corresponding primary volume that is configured to store a copy of the corresponding primary volume at a point in time;
receiving a snapshot request from a user to create a snapshot of a database object;
responding to the snapshot request by providing an indication of selected volumes of the plurality of mirrored volumes that correspond to the database object to a volume-level snapshot provider such that the volume-level snapshot provider creates a respective snapshot volume corresponding to each of the selected volumes using the snapshot mirror of the selected volume.

14. The computer readable storage medium as recited in claim 13 wherein the method further comprises the database utility accessing storage layout information to determine the selected volumes in response to the snapshot request.

15. The computer readable storage medium as recited in claim 13 wherein the method further comprises the database utility creating a default snapshot plan, wherein said default snapshot plan includes parameters for creating the snapshot.

16. The computer readable storage medium as recited in claim 15 wherein the default snapshot plan is a text file.

17. The computer readable storage medium as recited in claim 13 wherein the method further comprises quiescing the database object in response to the snapshot request.

18. The computer readable storage medium as recited in claim 13 wherein the method further comprises the database utility application creating a deportable disk group that includes the snapshot volumes corresponding to each of the selected volumes.

19. The computer readable storage medium as recited in claim 18 wherein the method further comprises deporting the disk group from a primary host to a secondary host.

20. A system comprising:
   means for configuring storage for a database as a plurality of mirrored volumes, wherein each volume of the plurality of mirrored volumes includes a primary volume and a snapshot mirror of the corresponding primary volume, wherein each snapshot mirror comprises a mirror of the corresponding primary volume that is configured to store a copy of the corresponding primary volume at a point in time;
   means for receiving a snapshot request from a user to create a snapshot of a database object;
   means for responding to the snapshot request by providing an indication of selected volumes of the mirror that correspond to the database object to a volume-level snapshot provider such that the volume-level snapshot provider creates a respective snapshot volume corresponding to each of the selected volumes using the snapshot mirror of the selected volume.

21. The method as recited in claim 1, wherein at least one of the snapshot volumes is mountable at a secondary host to support access to a file system.

22. The method as recited in claim 1, further comprising:
   the database utility validating a snapshot plan against a current storage configuration; and
   the volume-level snapshot provider creating the snapshot volumes in accordance with the validated snapshot plan.

23. The method as recited in claim 1, wherein the volume-level snapshot provider is a volume manager.

24. The method as recited in claim 1, further comprising:
   the database utility issuing one or more volume management commands to the volume-level snapshot provider to initiate a creation of the snapshot volumes, wherein the database utility is configured to automatically acquire authorization privileges needed for the one or more volume management commands.

25. A computer-implemented method, comprising:
   configuring storage for a database as a plurality of mirrored volumes, wherein each volume of the plurality of mirrored volumes includes a plurality of storage devices forming at least a primary volume and a snapshot mirror of the corresponding primary volume, wherein each snapshot mirror comprises a mirror of the corresponding primary volume that is configured to store a copy of the corresponding primary volume at a point in time;
   receiving a snapshot request to create a snapshot of a database object at a database utility;
   the database utility responding to the snapshot request by providing an indication of selected volumes of the plurality of mirrored volumes that correspond to the database object to a volume-level snapshot provider;
   the volume-level snapshot provider creating a respective snapshot volume corresponding to each of the selected volumes using at least one storage device of the plurality of storage devices corresponding to the selected volume.

* * * * *